(No Model.)

H. GUELS.
VALVE FOR FLUID PRESSURE BRAKES.

No. 397,125. Patented Feb. 5, 1889.

Witnesses:
E. J. Walker
Edwin S. Clarkson

Inventor:
Herman Guels
by F. W. Ritter Jr.
Atty

UNITED STATES PATENT OFFICE.

HERMAN GUELS, OF ST. LOUIS, MISSOURI, ASSIGNOR TO THE AMERICAN BRAKE COMPANY, OF SAME PLACE.

VALVE FOR FLUID-PRESSURE BRAKES.

SPECIFICATION forming part of Letters Patent No. 397,125, dated February 5, 1889.

Application filed ~~~ 21, 1888. Serial No. 283,332. (No model.)

*To all whom it may concern:*

Be it known that I, HERMAN GUELS, a citizen of the United States, residing at St. Louis, in the State of Missouri, have invented certain new and useful Improvements in Valves for Fluid-Pressure Brakes; and I hereby declare the following to be a full, clear, and exact description of the same, reference being had to the accompanying drawings, in which—

Figure 1:
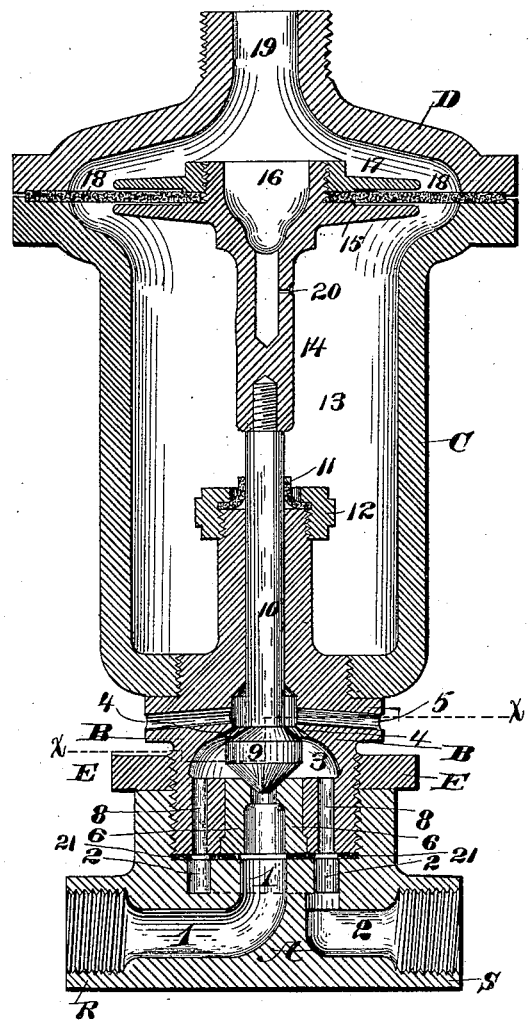
Figure 2:
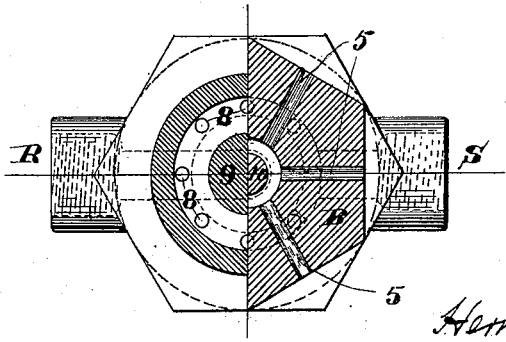

Figure 1 is a longitudinal central section of devices embodying my invention; and Fig. 2 is a transverse section of the same on the line *x x*, Fig. 1.

Like letters and figures refer to like parts wherever they occur.

The object of the present invention is to obtain a simple and efficient valve for fluid-pressure brakes, said valve to be operated directly from the train-pipe; and it consists, mainly, in the combination, with a double-seated valve which controls the port leading from the reservoir to the cylinder and the exhaust-port of the cylinder, of an air-chamber in direct communication with the train-pipe, and a diaphragm or piston arranged therein, provided with a leak, and connected with said valve, and also in certain particulars or special features of construction, all as will hereinafter more fully appear.

I will now proceed to describe my invention more specifically, so that others skilled in the art to which it appertains may apply the same.

In the drawings, A indicates the valve-bottom, provided with a boss, R, for coupling the same with the reservoir, and a similar boss, s, for connecting it with the cylinder. This bottom has two ports or passages—one centrally located, as at 1, and leading to the reservoir, and the other of annular form, as at 2, inclosing the central passage, 1, and leading to the cylinder.

B indicates the section which contains the valve, and consists of a threaded plug cored out to form a valve-chamber, 3, in which is a valve-seat, 4, above which is a series of radial passages, 5, forming the exhaust. The center of the cored plug B is closed by a plug, 6, having a central passage, 1, leading to the reservoir and an annular series of ports or passages, 8, which communicate with the annular passage 2, leading to the cylinder.

9 indicates the double valve arranged in the valve-chamber 3, and having a stem, 10, which projects through the plug B, and is encircled by a cup-packing, 11, secured by a threaded cap-nut, 12.

C indicates a shell adapted to be screwed on the threaded plug B, and it, in conjunction with the cap D, forms an air-chamber, 13.

15 indicates a disk having a hollow stem, 14, to which the stem 10 of valve 9 is connected. Said disk 15 has also a threaded stub, 16, for the reception of a threaded annular disk, 17, between which and disk 17 is clamped a diaphragm, 18, and the periphery of said diaphragm 18 is clamped between the sections C D of the shell. The cap-section D has a passage or port, 19, through which it communicates with the train-pipe by means of any suitable branch pipe or coupling, and a constant port or passage, 20, is made through the hollow stem 14, as shown, or through the diaphragm 18, if preferred. By means of this leak the pressure in the train-pipe and air-chamber 13 can become equalized from time to time.

The parts A B C D, being connected together, as shown, and coupled with the train-pipe, auxiliary reservoir, and cylinder, as hereinbefore specified, will operate as follows: The system having been charged with air at any desired pressure, the chamber 13, owing to the constant leak 20, will in time equalize with the train-pipe. The preponderance of pressure on the valve 9 will be in favor of the side toward 17, because the cross-sectional area of valve-stem 10 has to be deducted from the opposing pressure, and this will cause the valve 9 to close passage 1, leading to the reservoir, and open the exhaust 5 to the cylinder, in which condition the brakes are off. To apply the brakes, the pressure in the train-pipe is slightly but suddenly reduced, when, notwithstanding the constant leak 20, the momentary expansion of the air in chamber 13 will give an impulse to diaphragm 18, which will draw the valve on its seat 4, closing the exhaust-ports 5 and opening the passage 1, which, through ports 8, puts the auxiliary reservoir in communication with the cylinder and applies the brakes. The pressure of the reservoir-air on valve 9 will assist in retaining it on the seat 4, and in the meanwhile the air-chamber 13 will equalize with the train-pipe through the constant leak 20. The equilibrium between the train-pipe and chamber 13 having been established, the brakes can instantly be released by giving the train-pipe air or slightly increasing the pressure in the train-pipe, which imparts a reverse impulse to the diaphragm 18, forcing the valve 9 off of seat 4 and over on the seat of port or passage 1, leading to the reservoir, which closes the communication between the cylinder and reservoir and opens the communication between the cylinder and exhaust-ports 5.

E indicates a ring or jam-nut, which can be used to secure the parts when the plug-section B has been screwed down in bottom section, A, and 21 indicates a packing-ring, which can be inserted between the parts A B to secure a tight joint. It is evident to the skilled mechanic that a piston can be substituted for the diaphragm and that the constant leak can be made around instead of through the diaphragm or piston, and that the same are well-known equivalents for the construction claimed hereinafter. I therefore consider the same as embraced within the scope of my claims.

The advantages of the present invention are the simplicity of construction, quickness of operation of the valve, and its ready control from the train-pipe.

Having thus described the nature and operation of my invention, what I claim, and desire to secure by Letters Patent, is—

1. The combination, in a valve for fluid-pressure brakes, of a double-seating valve having an exhaust-port, and ports leading to the auxiliary reservoir and cylinder, an air-chamber which communicates with the train-pipe, and a diaphragm arranged in said chamber, having a constant leak and connected with the double valve, substantially as and for the purposes specified.

2. In a fluid-pressure valve, the combination of the bottom section, the plug-valve section and its valve, the shell-section C, forming an air-chamber around the stem of the valve, the diaphragm connected to the valve-stem and having a constant leak, and the cap-section having a port, substantially as and for the purposes specified.

In testimony whereof I affix my signature, in presence of two witnesses, this 26th day of July, 1888.

HERMAN GUELS.

Witnesses:
JNO. R. WILLIAMS,
JOHN C. H. STEVENSON.